US008841379B2

(12) United States Patent
Hayes

(10) Patent No.: US 8,841,379 B2
(45) Date of Patent: Sep. 23, 2014

(54) METHOD TO FORM AN AQUEOUS DISPERSION OF AN IONOMER-POLYOLEFIN BLEND

(75) Inventor: Richard Allen Hayes, Beaumont, TX (US)

(73) Assignee: E I du Pont de Nemours and Company, Wilmington, DE (US)

( * ) Notice: Subject to any disclaimer, the term of this patent is extended or adjusted under 35 U.S.C. 154(b) by 222 days.

(21) Appl. No.: 13/290,415

(22) Filed: Nov. 7, 2011

(65) Prior Publication Data
US 2013/0116373 A1    May 9, 2013

(51) Int. Cl.
*C08J 3/05* (2006.01)
*C08J 3/03* (2006.01)
*C08L 23/08* (2006.01)
*C08L 33/02* (2006.01)
*C08L 33/04* (2006.01)

(52) U.S. Cl.
CPC ......... *C08L 23/0876* (2013.01); *C08L 2201/54* (2013.01)
USPC ............ 524/522; 524/523; 525/221; 525/227

(58) Field of Classification Search
CPC combination set(s) only.
See application file for complete search history.

(56) References Cited

U.S. PATENT DOCUMENTS

| | | | |
|---|---|---|---|
| 2,313,144 A | 3/1943 | Gomm | |
| 3,236,917 A | 2/1966 | Natta et al. | |
| 3,264,272 A | 8/1966 | Rees | |
| 3,296,172 A | 1/1967 | Funck et al. | |
| 3,321,819 A | 5/1967 | Walter et al. | |
| 3,338,739 A | 8/1967 | Rees | |
| 3,355,319 A | 11/1967 | Rees | |
| 3,356,629 A | 12/1967 | Smith | |
| 3,389,109 A | 6/1968 | Harmon et al. | |
| 3,404,134 A | 10/1968 | Rees | |
| 3,472,825 A | 10/1969 | Walter et al. | |
| 3,553,178 A | 1/1971 | Clampitt et al. | |
| 3,562,196 A | 2/1971 | Bissot | |
| 3,644,258 A | 2/1972 | Louch et al. | |
| 3,645,992 A | 2/1972 | Elston | |
| 3,674,896 A | 7/1972 | Purcell et al. | |
| 3,798,194 A | 3/1974 | McCann et al. | |
| 3,823,108 A | 7/1974 | Bissot | |
| 3,872,039 A | 3/1975 | Vaughn et al. | |
| 3,896,065 A | 7/1975 | Reardon et al. | |
| 3,899,389 A | 8/1975 | Vaughn et al. | |
| 3,904,569 A | 9/1975 | Hekal et al. | |
| 3,932,368 A | 1/1976 | McConnell et al. | |
| 3,970,626 A | 7/1976 | Hurst et al. | |
| 3,983,268 A | 9/1976 | Scharf et al. | |
| 4,076,698 A | 2/1978 | Anderson et al. | |
| 4,136,069 A | 1/1979 | Vachon | |
| 4,173,669 A | 11/1979 | Ashida et al. | |
| 4,174,335 A | 11/1979 | Ohdaira et al. | |
| 4,181,566 A | 1/1980 | Vaughn | |
| 4,269,937 A | 5/1981 | Asanuma | |
| 4,329,305 A | 5/1982 | McClain | |
| 4,336,210 A | 6/1982 | McClain | |
| 4,400,440 A | 8/1983 | Shaw | |
| 4,410,655 A | 10/1983 | Funakoshi et al. | |
| 4,440,908 A | 4/1984 | McClain | |
| 4,508,804 A | 4/1985 | Asao et al. | |
| 4,540,736 A | 9/1985 | Herten et al. | |
| 4,612,155 A | 9/1986 | Wong et al. | |
| 4,775,713 A | 10/1988 | Homma et al. | |
| 4,888,394 A | 12/1989 | Boudreaux et al. | |
| 4,950,541 A | 8/1990 | Tabor et al. | |
| 4,970,258 A | 11/1990 | Homma et al. | |
| 4,978,707 A | 12/1990 | Tanaka et al. | |
| 5,026,798 A | 6/1991 | Canich et al. | |
| 5,028,674 A | 7/1991 | Hatch et al. | |
| 5,055,438 A | 10/1991 | Canich et al. | |
| 5,057,475 A | 10/1991 | Canich et al. | |
| 5,064,802 A | 11/1991 | Stevens et al. | |
| 5,075,769 A | 12/1991 | Allen et al. | |
| 5,082,697 A | 1/1992 | Patton et al. | |
| 5,096,867 A | 3/1992 | Canich | |
| 5,132,380 A | 7/1992 | Stevens et al. | |
| 5,155,157 A | 10/1992 | Statz et al. | |
| 5,160,484 A | 11/1992 | Nikoloff | |
| 5,179,168 A | 1/1993 | Hirasawa | |
| 5,194,509 A | 3/1993 | Hasenbein et al. | |
| 5,206,279 A | 4/1993 | Rowland et al. | |
| 5,231,106 A | 7/1993 | Knutsen et al. | |
| 5,244,969 A | 9/1993 | Yamada | |
| 5,272,236 A | 12/1993 | Lai et al. | |
| 5,278,272 A | 1/1994 | Lai et al. | |
| 5,304,608 A | 4/1994 | Yabuki et al. | |
| 5,330,788 A | 7/1994 | Roberts | |
| 5,346,963 A | 9/1994 | Hughes et al. | |
| 5,374,687 A | 12/1994 | Cooperman et al. | |

(Continued)

FOREIGN PATENT DOCUMENTS

EP    0266994 A2    11/1987
EP    0514828 A1    5/1992

(Continued)

OTHER PUBLICATIONS

Machine Translation of JP 2001-206953A. Jul. 31, 2001.*
PCT International Search Report for International Application No. PCT/US2012/058304 dated Jan. 10, 2013.
PCT International Preliminary Report on Patentability for International Application No. PCT/US2012/058304 dated May 13, 2014.

*Primary Examiner* — Robert C Boyle
*Assistant Examiner* — Stephen Rieth

(57) ABSTRACT

Disclosed is a method to form an aqueous dispersion comprising a blend composition comprising or consisting essentially of about 75 to about 99.9 weight % of an ionomer composition and about 0.1 to about 25 weight % of an ethylene acrylate ester copolymer composition, a grafted polyolefin composition or a combination thereof, the method comprising mixing the solid blend composition with water heated to a temperature from about 80 to about 100° C.

9 Claims, No Drawings

(56) References Cited

U.S. PATENT DOCUMENTS

| | | |
|---|---|---|
| 5,374,696 A | 12/1994 | Rosen et al. |
| 5,387,635 A | 2/1995 | Rowland et al. |
| 5,409,765 A | 4/1995 | Boettcher et al. |
| 5,420,220 A | 5/1995 | Cheruvu et al. |
| 5,430,111 A | 7/1995 | Recchia et al. |
| 5,445,893 A | 8/1995 | Mueller et al. |
| 5,453,410 A | 9/1995 | Kolthammer et al. |
| 5,470,993 A | 11/1995 | Devore et al. |
| 5,523,358 A | 6/1996 | Hirose et al. |
| 5,542,677 A | 8/1996 | Sullivan et al. |
| 5,550,177 A | 8/1996 | Fanta et al. |
| 5,591,803 A | 1/1997 | Sullivan et al. |
| 5,591,806 A | 1/1997 | Recchia et al. |
| 5,677,383 A | 10/1997 | Chum et al. |
| 5,688,869 A | 11/1997 | Sullivan |
| 5,703,187 A | 12/1997 | Timmers |
| 5,705,565 A | 1/1998 | Hughes et al. |
| 5,744,250 A | 4/1998 | Lee et al. |
| 5,844,045 A | 12/1998 | Kolthammer et al. |
| 5,869,575 A | 2/1999 | Kolthammer et al. |
| 5,955,547 A | 9/1999 | Roberts et al. |
| 5,986,028 A | 11/1999 | Lai et al. |
| 5,993,604 A | 11/1999 | Finlayson et al. |
| 6,013,819 A | 1/2000 | Stevens et al. |
| 6,100,336 A | 8/2000 | Sullivan et al. |
| 6,111,023 A | 8/2000 | Chum et al. |
| 6,159,608 A | 12/2000 | Friedman et al. |
| 6,245,858 B1 | 6/2001 | Sullivan et al. |
| 6,316,549 B1 | 11/2001 | Chum et al. |
| 6,448,341 B1 | 9/2002 | Kolthammer et al. |
| 6,458,897 B1 | 10/2002 | Tokita et al. |
| 6,482,886 B1 | 11/2002 | Finlayson et al. |
| 6,500,888 B2 | 12/2002 | Baumgartner et al. |
| 6,518,365 B1 | 2/2003 | Powell et al. |
| 6,538,070 B1 | 3/2003 | Cardwell et al. |
| 6,545,091 B1 | 4/2003 | Lee et al. |
| 6,566,446 B1 | 5/2003 | Parikh et al. |
| 6,852,792 B1 | 2/2005 | Capendale et al. |
| 7,279,513 B2 | 10/2007 | Zhang et al. |
| 7,408,007 B2 | 8/2008 | Roberts et al. |
| 7,439,276 B2 | 10/2008 | Strandburg et al. |
| 7,470,736 B2 | 12/2008 | Cooper |
| 7,528,080 B2 | 5/2009 | Prieto et al. |
| 7,588,662 B2 | 9/2009 | Lang et al. |
| 2005/0100754 A1 | 5/2005 | Moncla et al. |
| 2005/0271888 A1 | 12/2005 | Moncla et al. |
| 2006/0124554 A1 | 6/2006 | Fechtenkotter et al. |
| 2007/0117916 A1 | 5/2007 | Anderson et al. |
| 2007/0137808 A1 | 6/2007 | Lostocco et al. |
| 2007/0137809 A1 | 6/2007 | Dyer et al. |
| 2007/0137810 A1 | 6/2007 | Dyer et al. |
| 2007/0137811 A1 | 6/2007 | Runge et al. |
| 2007/0137813 A1 | 6/2007 | Nickel et al. |
| 2007/0141323 A1 | 6/2007 | Wevers et al. |
| 2007/0144697 A1 | 6/2007 | Dyer et al. |
| 2007/0243331 A1 | 10/2007 | Strandburg et al. |
| 2007/0284069 A1 | 12/2007 | Dyer et al. |
| 2007/0292705 A1 | 12/2007 | Moncla et al. |
| 2007/0295464 A1 | 12/2007 | Fetner et al. |
| 2007/0295465 A1 | 12/2007 | Dyer et al. |
| 2008/0000598 A1 | 1/2008 | Dyer et al. |
| 2008/0000602 A1 | 1/2008 | Dyer et al. |
| 2008/0009586 A1 | 1/2008 | Van Sumeren et al. |
| 2008/0041543 A1 | 2/2008 | Dyer et al. |
| 2008/0073045 A1 | 3/2008 | Dyer et al. |
| 2008/0073046 A1 | 3/2008 | Dyer et al. |
| 2008/0076844 A1 | 3/2008 | Van Sumeren et al. |
| 2008/0078445 A1 | 4/2008 | Patel et al. |
| 2008/0115825 A1 | 5/2008 | Patel et al. |
| 2008/0118728 A1 | 5/2008 | Magley et al. |
| 2008/0132628 A1 | 6/2008 | Hausmann et al. |
| 2008/0135195 A1 | 6/2008 | Hermans et al. |
| 2008/0176968 A1 | 7/2008 | VanSumeren et al. |
| 2008/0182040 A1 | 7/2008 | Chereau et al. |
| 2008/0216977 A1 | 9/2008 | Dyer et al. |
| 2008/0230195 A1 | 9/2008 | Lang et al. |
| 2008/0292833 A1 | 11/2008 | Wevers et al. |
| 2008/0295985 A1 | 12/2008 | Moncla et al. |
| 2009/0194450 A1 | 8/2009 | Dabadie et al. |
| 2009/0202829 A1 | 8/2009 | Fox et al. |
| 2009/0253321 A1 | 10/2009 | Wevers et al. |
| 2009/0297747 A1 | 12/2009 | Hausmann et al. |
| 2010/0048784 A1 | 2/2010 | Moncla et al. |
| 2010/0055273 A1 | 3/2010 | Chen |
| 2010/0137501 A1 | 6/2010 | Moncla et al. |
| 2010/0272898 A1 | 10/2010 | Chen et al. |

FOREIGN PATENT DOCUMENTS

| | | | |
|---|---|---|---|
| EP | 1163276 B1 | | 11/2004 |
| GB | 1243303 | | 8/1971 |
| JP | 50135141 A | | 10/1975 |
| JP | 64009338 A | | 1/1989 |
| JP | 05075769 B | | 3/1993 |
| JP | 05-075769 B | * | 10/1993 |
| JP | 06-000872 B | * | 1/1994 |
| JP | 06000872 B | | 1/1994 |
| JP | 09040924 A | | 2/1997 |
| JP | 09175592 A | | 7/1997 |
| JP | 10006640 A | | 1/1998 |
| JP | 10060186 A | | 3/1998 |
| JP | 10316872 A | | 12/1998 |
| JP | 2868862 B2 | | 3/1999 |
| JP | 11147288 A | | 6/1999 |
| JP | 11158332 A | | 6/1999 |
| JP | 2958102 B2 | | 10/1999 |
| JP | 11291406 A | | 10/1999 |
| JP | 2000328046 A | | 11/2000 |
| JP | 2001206953 A | * | 7/2001 |
| JP | 20011355185 A | | 12/2001 |
| JP | 2002012722 A | | 1/2002 |
| JP | 2002234975 A | | 8/2002 |
| JP | 3356376 B2 | | 12/2002 |
| JP | 2003026868 A | | 1/2003 |
| JP | 2003291283 A | | 10/2003 |
| JP | 2004217759 A | | 8/2004 |
| JP | 3599912 B2 | | 12/2004 |
| JP | 2005075878 A | | 3/2005 |
| JP | 2005075879 A | | 3/2005 |
| JP | 2006026986 A | | 2/2006 |
| JP | 3878268 B2 | | 2/2007 |
| JP | 3926486 B2 | | 6/2007 |
| JP | 2007138004 A | | 6/2007 |
| JP | 3985881 B2 | | 10/2007 |
| JP | 2007301797 A | | 11/2007 |
| JP | 2007302764 A | | 11/2007 |
| JP | 2008138116 A | | 6/2008 |
| JP | 2008273998 A | | 11/2008 |
| JP | 4197901 B2 | | 12/2008 |
| JP | 2009035699 A | | 2/2009 |
| JP | 2009084324 A | | 4/2009 |
| JP | 2009091426 | | 4/2009 |
| JP | 2009101677 A | | 5/2009 |
| JP | 2009138139 A | | 6/2009 |
| WO | 96/07677 A1 | | 3/1996 |
| WO | 9910276 A1 | | 3/1999 |
| WO | 0044801 A1 | | 8/2000 |
| WO | 2005021638 A2 | | 3/2005 |
| WO | 2007008633 A2 | | 1/2007 |
| WO | 2008005501 A2 | | 1/2008 |
| WO | 2008052122 A1 | | 5/2008 |
| WO | 2009035877 A1 | | 3/2009 |
| WO | 2009045731 A2 | | 4/2009 |
| WO | 2009055275 A2 | | 4/2009 |
| WO | 2009064993 A1 | | 5/2009 |
| WO | 2009072600 A1 | | 6/2009 |
| WO | 2011058119 A1 | | 5/2011 |
| WO | 2011058119 A1 | | 5/2011 |
| WO | 2011058121 A1 | | 5/2011 |
| WO | 2011068525 A1 | | 6/2011 |
| WO | 2011087478 A1 | | 7/2011 |

* cited by examiner

METHOD TO FORM AN AQUEOUS DISPERSION OF AN IONOMER-POLYOLEFIN BLEND

FIELD OF THE INVENTION

The present invention is directed to a method to form aqueous dispersions comprising ionomer-polyolefin blends.

BACKGROUND OF THE INVENTION

Ionomers of ethylene copolymers with alpha,beta-ethylenically unsaturated carboxylic acids are known in the art, wherein at least a portion of the carboxylic acid groups of the copolymer are neutralized to form carboxylate salts comprising alkali metal, alkaline earth metal or transition metal cations. See for example U.S. Pat. Nos. 3,264,272; 3,338,739; 3,355,319; 5,155,157; 5,244,969; 5,304,608; 5,688,869; 6,245,858; 6,518,365; and U.S. Patent Application Publication 2009/0297747.

Aqueous dispersions of ionomers are also known in the art. See for example U.S. Pat. Nos. 3,904,569; 4,136,069; 4,269,937; 4,508,804; 5,409,765; and Japanese Patent Applications JP01009338 and JP05075769. They have been produced by dissolving the acid copolymer precursors in a solvent, neutralization of the acid functionalities with generally ammonia, amines or alkali metal ions, and dilution of the solution into water followed by partial or complete removal of the solvent. See for example U.S. Pat. Nos. 2,313,144; 3,389,109; 3,562,196; 5,430,111; 5,591,806; Japanese Patent Applications JP50084687 and JP2009091426.

Aqueous ionomer dispersions have also been produced by heating acid copolymer precursors or ionomers in hot aqueous ammonia and other neutralizing agents. See for example U.S. Pat. Nos. 3,553,178; 3,644,258; 3,674,896; 3,823,108; 3,872,039; 3,899,389; 3,970,626; 3,983,268; 4,400,440; 4,540,736; 5,160,484; 5,206,279; 5,330,788; 5,387,635; 5,550,177; 6,852,792; U.S. Patent Application Publication 2007/0117916; Japanese Patent Application JP06000872; and PCT Patent Application Publication WO2000/044801.

Aqueous ionomer dispersions have also been produced by dispersing the acid copolymer precursor in aqueous solutions of neutralizing agents at temperatures under high shear process conditions above the boiling point of water, necessitating the use of pressure vessels such as autoclaves and extruders. See for example U.S. Pat. Nos. 5,082,697; 5,374,687; 5,993,604; 6,482,886; 7,279,513; 7,470,736; U.S. Patent Application Publications 2006/0124554; 2007/0243331; PCT Patent Application WO2011/087478; and Japanese Patent Applications JP10006640; and JP50135141.

Aqueous ionomer dispersions have also been produced by dispersing the ionomer in aqueous solutions under high shear process conditions at temperatures above the boiling point of water, necessitating the use of pressure vessels such as autoclaves and extruders. See for example U.S. Pat. Nos. 4,173,669; 4,329,305; 4,410,655; 6,458,897; Japanese Applications JP11158332; JP2005075878; JP 200575879; and PCT Patent Application Publication WO1999/10276.

Aqueous ionomer dispersions have also been produced by dispersing highly neutralized, low melt index (MI) ionomers in hot water. See for example U.S. Pat. Nos. 3,321,819; 3,472,825; and 4,181,566.

Blends incorporating a polyolefin with an ionomer are known. See for example U.S. Pat. Nos. 5,179,168; 5,445,893; 5,542,677; 5,591,803; 6,100,336; U.S. Patent Application Publication US 20080132628; PCT Patent Application Publication WO2009072600; and Japanese Patent Applications JP09-040924; JP09-175592; JP10-060186; JP10-316872; JP11-147288; JP11-291406; JP2868862; JP3356376; JP3878268; JP3926486; JP3985881; JP4197901; JP2002-012722; JP2002-234975; JP2003-026868; JP2003-291283; JP2004-217759; JP2006-026986; JP2007-138004; JP2007-301797; JP2007-302764; JP2008-138116; JP2008-273998; JP2009-035699; JP2009-084324; JP2009-101677; JP2009-138139; JP2868862; JP09040924; JP09175592; and JP3599912.

Aqueous dispersions incorporating a major portion of a polyolefin with a minor portion of an ionomer, generally functioning as a dispersant for the polyolefin, are known. See for example U.S. Pat. Nos. 3,296,172; 3,356,629; 3,896,065; 4,174,335; 4,336,210; 4,440,908; 4,775,713; 4,970,258; 4,978,707; 7,439,276; 7,528,080; 7,588,662; U.S. Patent Application Publications 2005/0271888; 2007/0137808; 2007/0137809; 2007/0137810; 2007/0137811; 2007/0137813; 2007/0144697; 2007/0284069; 2007/0292705; 2007/0295464; 2007/0295465; 2008/0000598; 2008/0000602; 2008/0009586; 2008/0041543; 2008/0073045; 2008/0073046; 2008/0076844; 2008/0135195; 2008/0230195; 2008/0216977; 2008/0295985; 2009/0202829; 2009/0253321; PCT Patent Application Publications WO2007/008633; WO2008/052122; WO2009/035877; WO2009/055275; WO2009/064993 and Japanese Patent Applications JP2958102; JP 2001-1355185.

Aqueous dispersions incorporating a major portion of a polyolefin with a minor portion of an ionomer have also been produced by dispersing the polyolefin and the ionomer in aqueous solutions under high shear process conditions at temperatures above the boiling point of water, necessitating the use of pressure vessels such as autoclaves and extruders. See for example U.S. Patent Application Publications 2005/0100754; 2007/0141323; 2008/0118728; 2008/0176968; 2008/0182040; 2008/0292833; 2009/0194450; 2010/0048784; 2010/0137501; and PCT Patent Application Publications WO2005/021638; WO2008/005501; WO2009/045731; WO2011/058121; WO2011/068525.

Aqueous dispersions incorporating a major portion of ionomer and a minor portion of polar polyolefin were produced, for example, by mixing preformed dispersions of each component. See for example British Patent GB1243303; European Patent Application EP1163276; and Japanese Application JP2000328046.

Aqueous dispersions incorporating a major portion of ionomer and a minor portion of polar polyolefin were produced, for example, by preparing a solid blend of an acid copolymer with the polar polyolefin, and treating the blend with a heated aqueous ammonia solution (PCT Patent Application Publication WO2011/058119).

SUMMARY OF THE INVENTION

The invention relates to a blend composition comprising or consisting essentially of (a) about 75 to about 99.9 weight % of an ionomer composition comprising or consisting essentially of a parent acid copolymer that comprises copolymerized units of ethylene and about 18 to about 30 weight % of copolymerized units of acrylic acid or methacrylic acid, based on the total weight of the parent acid copolymer, the acid copolymer having a melt flow rate (MFR) from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts comprising potassium cations, sodium cations or combinations thereof; and (b) about 0.1 to about 25 weight %, based on the combination of (a) and (b), of (i) at least one ethylene ester copolymer comprising copolymerized units of ethylene and about 10 to about 45 weight % of copolymerized units of an alpha, beta-ethylenically unsaturated carboxylic acid ester, based on the total weight of the ethylene ester copolymer; (ii) a grafted polyolefin composition comprising a parent polyolefin grafted with about 0.1 to about 5 weight % of an alpha,beta-ethylenically unsaturated carboxylic acid or anhydride, based on the total weight of the grafted polyolefin; or (iii) a combination of the ethylene ester copolymer and the grafted polyolefin.

The invention provides a method for making an aqueous dispersion comprising a mixture of an ionomer and an ethylene ester copolymer, a grafted polyolefin composition or a combination thereof, the method comprising or consisting essentially of (1) providing a solid blend composition comprising or consisting essentially of the composition described above;

(2) mixing the solid blend composition with water heated to a temperature from about 80 to about 100° C. (under low shear conditions) to provide a heated aqueous blend dispersion; and (3) optionally cooling the heated aqueous blend dispersion to a temperature of about 20 to 30° C., wherein the blend remains dispersed in the liquid phase.

One embodiment is wherein (2) comprises (i) adding an article formed from the preformed solid blend composition to water at a temperature of about 20 to 30° C. to form a mixture of solid blend and water; and subsequently (ii) heating the mixture to a temperature from about 80 to about 100° C.

Another embodiment is wherein (2) comprises adding an article formed from the preformed solid blend composition to water preheated to a temperature from about 80 to about 100° C.

The invention also provides an aqueous dispersion of a blend composition as described above. The aqueous dispersion may be produced using the methods described above.

DETAILED DESCRIPTION OF THE INVENTION

Unless otherwise defined, all technical and scientific terms used herein have the same meaning as commonly understood by one of ordinary skill in the art to which this invention belongs. In case of conflict, the specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the claimed invention. Where applicants have defined an invention or a portion thereof with an open-ended term such as "comprising," unless otherwise stated the description should be interpreted to also describe such an invention using the term "consisting essentially of".

Use of "a" or "an" are employed to describe elements and components of the invention. This is merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized comonomers.

As used herein, "disperse," "dispersing" and related terms refer to a process in which solid articles such as pellets of polymer are mixed with water and over a brief period of time disappear into the liquid phase. The terms "aqueous dispersion" and "dispersion" describe a transparent, free-flowing liquid with no solids visible to the human eye. No characterization is made regarding the interaction of the polymer molecules with the water molecules in such aqueous dispersions. "Self-dispersible" means that the material disperses readily in hot (80 to 100° C.) water without need for additional dispersants or reagents.

Methods to produce aqueous dispersions comprising certain ionomer-polyolefin blends are disclosed herein. Surprisingly, we have found that certain ionomer-polyolefin blends with certain compositional characteristics readily form aqueous dispersions when mixed with hot water under low shear conditions. In contrast, previous methods required significantly more rigorous conditions to form dispersions.

The dispersion method provides a process simplification which requires less energy and is inherently safer than disclosed in the prior art dispersion methods, such as high pressure, high shear, autoclave processes or extrusion processes.

Ionomer Composition

The ionomer used herein is derived from certain parent acid copolymers comprising copolymerized units of ethylene and about 18 to about 30 weight % of copolymerized units of an alpha, beta-ethylenically unsaturated carboxylic acid such as acrylic acid or methacrylic acid. Preferably, the parent acid copolymer used herein comprises about 19 to about 25 weight %, or more preferably about 19 to about 23 weight %, of the alpha, beta-ethylenically unsaturated carboxylic acid, based on the total weight of the copolymer.

Preferably, the alpha, beta-ethylenically unsaturated carboxylic acid is methacrylic acid. Of note are acid copolymers consisting essentially of copolymerized units of ethylene and copolymerized units of the alpha, beta-ethylenically unsaturated carboxylic acid and 0 weight % of additional comonomers; that is, dipolymers of ethylene and the alpha, beta-ethylenically unsaturated carboxylic acid. Preferred acid copolymers are ethylene methacrylic acid dipolymers.

The parent acid copolymers used herein may be polymerized as disclosed in U.S. Pat. Nos. 3,404,134; 5,028,674; 6,500,888; and 6,518,365.

The parent acid copolymers used herein preferably have a melt flow rate (MFR) of about 200 to about 1000 grams/10 min as measured by ASTM D1238 at 190° C. using a 2160 g load. A similar ISO test is ISO 1133. Alternatively, the parent acid copolymers have MFR from a lower limit of 200, 250 or 300 to an upper limit of 400, 500, 600 or 1000. The preferred melt flow rate of the parent acid copolymer provides ionomers with optimum physical properties in the final shaped article while still allowing for rapid self-dispersion in hot water. Ionomers derived from parent acid copolymers with melt flow rates below about 200 grams/10 minutes have minimal hot water self-dispersibility, while ionomers derived from parent acid copolymer melt flow rates of greater than about 1000 grams/10 minutes may reduce the physical properties in the intended enduse.

In some embodiments, blends of two or more ethylene acid copolymers may be used, provided that the aggregate components and properties of the blend fall within the limits described above for the ethylene acid copolymers. For example, two ethylene methacrylic acid dipolymers may be used such that the total weight % of methacrylic acid is about 18 to about 30 weight % of the total polymeric material and the melt flow rate of the blend is about 200 to about 1000 grams/10 min.

The ionomers disclosed herein are produced from the parent acid copolymers, wherein from about 50 to about 70%, or preferably from about 55 to about 60%, such as about 60%, of the total carboxylic acid groups of the parent acid copolymers, as calculated for the non-neutralized parent acid copolymers, are neutralized to form carboxylic acid salts with potassium ions, sodium ions or combinations thereof. The parent acid copolymers may be neutralized using methods disclosed in, for example, U.S. Pat. No. 3,404,134. Ionomers wherein the cations of the carboxylate salts consist essentially of sodium cations are notable.

Importantly, the ionomer compositions combine the properties of being self-dispersible in hot water along with being thermoplastic, allowing for melt fabrication into many articles of commerce. Preferably, the ionomers used herein have a melt flow rate (MFR) of at least 1 gram/10 min, such as about 1 to about 20 grams/10 min as measured by ASTM D1238 at 190° C. using a 2160 g load. More preferably, the ionomer composition has a MFR of about 1 to about 10 grams/10 min, and most preferably has a MFR of about 1 to about 5 grams/10 min. The combination of the above described parent acid copolymer melt flow rates and the neutralization levels provides ionomers which combine the properties of being easily self-dispersible in hot water and easily melt fabricated into articles of commerce.

In some embodiments, blends of two or more ionomers may be used, provided that the aggregate components and properties of the blend fall within the limits described above for the ionomers.

The ionomer composition may also contain other additives known in the art. The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents.

Ethylene Ester Copolymer Composition

The ethylene ester copolymer used herein comprises or consists essentially of copolymerized units of ethylene and about 10 to about 45 weight % of copolymerized units of an alpha, beta-ethylenically unsaturated carboxylic acid ester, based on the total weight of the ethylene ester copolymer. Preferably, the ethylene ester copolymer comprises about 15 to about 40 weight %, or more preferably about 20 to about 35 weight %, of the alpha, beta-ethylenically unsaturated carboxylic acid ester, based on the total weight of the copolymer. Of note is the dipolymer consisting essentially of copolymerized units of ethylene and copolymerized units of an alpha, beta-ethylenically unsaturated carboxylic acid ester.

The alpha, beta-ethylenically unsaturated carboxylic acid ester comonomer includes, but is not limited to, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol)methyl ether acrylate, poly(ethylene glycol)methyl ether methacrylate, poly(ethylene glycol)behenyl ether acrylate, poly(ethylene glycol)behenyl ether methacrylate, poly(ethylene glycol)4-nonylphenyl ether acrylate, poly(ethylene glycol)4-nonylphenyl ether methacrylate, poly(ethylene glycol)phenyl ether acrylate, poly(ethylene glycol)phenyl ether methacrylate, dimethyl maleate, diethyl maleate, dibutyl maleate, dimethyl fumarate, diethyl fumarate, dibutyl fumarate, dimenthyl fumarate, and the like and combinations thereof. Preferable alpha, beta-ethylenically unsaturated carboxylic acid ester comonomers include, but are not limited to, methyl acrylate, ethyl acrylate, isopropyl acrylate, butyl acrylate and combinations thereof. More preferably, the alpha, beta-ethylenically unsaturated carboxylic acid ester comonomer is methyl acrylate.

Grafted Polyolefin Composition

The grafted polyolefin composition comprises a parent polyolefin grafted with about 0.1 to about 5 weight % of an alpha, beta-ethylenically unsaturated carboxylic acid or anhydride, based on the total weight of the grafted polyolefin.

The parent polyolefin may comprise ethylene-based polymers, such as polyethylene and ethylene-alpha olefin copolymers, propylene-based polymers, such as polypropylene and propylene-alpha olefin copolymers, and propylene-ethylene copolymers. For example, the parent polyolefin may be polypropylene, polyethylene, and copolymers thereof, and blends thereof, as well as ethylene-propylene-diene terpolymers. The parent polyolefin includes homogeneous polymers described in U.S. Pat. No. 3,645,992; high density polyethylene (HDPE) as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE). Parent polyolefin compositions described in U.S. Pat. Nos. 6,566,446, 6,538,070, 6,448,341, 6,316,549, 6,111,023, 5,869,575, 5,844,045, or 5,677,383 are also suitable in some embodiments. Blends of polymers can be used as well. In some embodiments, the blends include two different Ziegler-Natta polymers. In other embodiments, the blends can include blends of a Ziegler-Natta and a metallocene polymer. In still other embodiments, the polymer used herein is a blend of two different metallocene polymers. In other embodiments single site catalysts may be used.

Examples of ethylene-alpha olefin copolymers comprise an alpha-olefin interpolymer of ethylene with at least one comonomer selected from the group consisting of a $C_4$-$C_{20}$ linear, branched or cyclic diene, and a compound represented by the formula $H_2C\!\!=\!\!CHR$ wherein R is a $C_1$-$C_{20}$ linear, branched or cyclic alkyl group or a $C_6$-$C_{20}$ aryl group. Examples of comonomers include propylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the interpolymer of ethylene has a density of less than about 0.92 g/cc.

Examples of propylene-alpha olefin copolymers comprise an alpha-olefin interpolymer of propylene with at least one comonomer selected from the group consisting of ethylene, a $C_4$-$C_{20}$ linear, branched or cyclic diene, and a compound represented by the formula $H_2C\!\!=\!\!CHR$ wherein R is a R is a $C_1$-$C_{20}$ linear, branched or cyclic alkyl group or a $C_6$-$C_{20}$ aryl group. Examples of comonomers include ethylene, 1-butene, 3-methyl-1-butene, 4-methyl-1-pentene, 3-methyl-1-pentene, 1-heptene, 1-hexene, 1-octene, 1-decene, and 1-dodecene.

Further examples of parent polyolefins which may be used include homopolymers and copolymers (including elastomers) of an olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer.

Preferably the grafted polyolefin is made from a parent polyolefin made from ethylene and an alpha-olefin having 3 to 20 carbons having a density of about 0.92 g/cc (ASTM D792) or less, grafted with about 0.1 to about 5 weight % of an alpha,beta-ethylenically unsaturated carboxylic acid or anhydride. The grafted polyolefin is made by grafting the alpha, beta-ethylenically unsaturated carboxylic acid or anhydride onto the parent polyolefin.

Preferably the grafted polyolefin is made from a parent polyolefin that has a density of about 0.92 g/cc (ASTM D-792) or less, or about 0.90 g/cc or less, about 0.88 g/cc or less, or about 0.88 to about 0.84 g/cc.

Preferably the parent polyolefin is a polyolefin copolymer comprising ethylene and alpha-olefin comonomers. The parent polyolefin copolymer comprises at least two monomers, but may incorporate more than two comonomers, such as terpolymers, tetrapolymers and the like. Preferably, the parent polyolefin copolymer comprises from a lower limit of about 5 weight % m about 15 weight %, about 20 weight % or about 25 weight % to an upper limit of about 35 weight %, about 40 weight %, about 45 weight % or about 50 weight % (all based on the total weight of the parent polyolefin copolymer).

The alpha-olefin comonomer contains from 3 to 20 carbons and may be a linear, branched or cyclic alpha-olefin. Preferable alpha-olefins are selected from the group consisting of propene, 1-butene, 3-methyl-1-butene, 4-methyl-1-pentene, 1-hexene, 1-heptene, 1-octene, 1-decene, 1-dodecene, 1-tetradecene, 1-hexadecene, 1-octadecene, 3-cyclohexyl-1-propene, vinyl cyclohexane and the like and mixtures thereof. The alpha-olefin comonomer preferably contains 3 to 10 carbons. The density of the alpha-olefin copolymer will generally depend on the type and level of alpha-olefin incorporated.

The parent polyolefin copolymer may optionally incorporate a minor amount of other olefinic comonomers; for example cyclic olefins such as norbornene; styrene; dienes such as dicyclopentadiene, ethylidene norbornene and vinyl norbornene; and the like and mixtures thereof. When included, the optional comonomer may be incorporated at a level of about 15 weight % or less, based on the total weight of the parent polyolefin copolymer.

The parent polyolefin may be produced by any known method and may be catalyzed with any known polymerization catalyst such as, for example, radical-, Ziegler-Natta- or metallocene-catalyzed polymerizations (e.g., U.S. Pat. Nos. 3,645,992, 5,026,798, 5,055,438, 5,057,475, 5,064,802, 5,096,867, 5,132,380, 5,231,106, 5,272,236, 5,278,272, 5,374,696, 5,420,220, 5,453,410, 5,470,993, 5,703,187, 5,986,028, 6,013,819, 6,159,608, and EP514828).

Blends of two or more parent polyolefin copolymers may be used if desired.

The grafted polyolefin comprises an alpha, beta-ethylenically unsaturated carboxylic acid or anhydride grafted to the parent polyolefin. In a grafted polymer, none of the atoms originally contained in the alpha, beta-ethylenically unsaturated carboxylic acid or anhydride moiety are included in the polymer backbone. The alpha, beta-ethylenically unsaturated carboxylic acid or anhydride preferably is selected from the group consisting of maleic anhydride, maleic acid, fumaric acid, acrylic acid, methacrylic acid, itaconic anhydride, itaconic acid, citraconic acid, citraconic anhydride, crotonic acid, crotonic anhydride, methyl crotonic acid, cinnamic acid, endo-bicyclo-[2.2.1]-5-heptene-2,3-dicarboxylic acid, endo-bicyclo-[2.2.1]-5-heptene-2,3-dicarboxylic anhydride, cis-4-cyclohexene-1,2-dicarboxylic acid, cis-4-cyclohexene-1,2-dicarboxylic anhydride and the like and mixtures thereof. Metal salts, anhydrides, esters, amides or imides of the above acids may also be used. More preferably, the alpha, beta-ethylenically unsaturated carboxylic acid or anhydride is maleic anhydride.

The alpha, beta-ethylenically unsaturated carboxylic acid or anhydride may be grafted onto the parent polyolefin by any known method. For example, the alpha, beta-ethylenically unsaturated carboxylic acid or anhydride may be grafted onto the parent polyolefin by the methods disclosed in U.S. Pat. Nos. 3,236,917, 3,932,368, 4,612,155, 4,888,394, 4,950,541, 5,194,509, 5,346,963, 5,523,358, 5,705,565, 5,744,250, 5,955,547, 6,545,091, 7,408,007, US2008/0078445, US2008/0115825, and EP0266994.

The level of the alpha, beta-ethylenically unsaturated carboxylic acid or anhydride grafted onto the parent polyolefin is preferably from about 0.1 to 5 weight %, based on the total weight of the grafted polyolefin. The level of the alpha, beta-ethylenically unsaturated carboxylic acid or anhydride may be from about 0.3 to 4 weight % or from about 0.5 to 2 weight %, based on the total weight of the grafted polyolefin.

Blend Composition

The blend composition comprises or consists essentially of about 75 to about 99.9 weight % of an ionomer composition and about 0.1 to about 25 weight % of an ethylene ester copolymer composition, a grafted polyolefin composition or a combination thereof. The blend composition comprises or consists essentially of preferably about 80 to about 99 weight %, more preferably about 90 to about 99 weight % and most preferably about 95 to about 99 weight % of an ionomer composition and preferably about 20 to about 1 weight %, more preferably about 10 to about 1 weight % and most preferably about 5 to about 1 weight % of an ethylene acrylate ester copolymer composition, a grafted polyolefin composition or a combination thereof.

Of note is the blend composition consisting essentially of the ionomer and at least one ethylene ester copolymer, such as a blend comprising about 3 to about 15 weight % of an ethylene ester copolymer or about 3 to about 15 weight % of a combination of two different ethylene ester copolymers. Also of note is the blend composition consisting essentially of the ionomer and the grafted polyolefin. Also of note is the blend composition consisting essentially of the ionomer, the ethylene ester copolymer and the grafted polyolefin, such as a blend comprising about 3 to about 5 weight % of the ethylene ester copolymer and about 3 to about 6 weight % of the grafted polyolefin.

The process to produce the blends can be performed by any high shear, intensive melt mixing process known in the art. Preferably, such a process would involve intensive mixing of the molten ionomer composition with the ethylene acrylate ester copolymer composition, the grafted polyolefin composition or a combination thereof. For example, the intensive mixing may be provided through static mixers, rubber mills, Brabender mixers, Buss kneaders, single screw extruders or twin screw extruders. Extruders are the most convenient to use because of their high throughput, possible modular construction and ease of assembly, choice of many mixing screws, and ease of control and maintenance of process temperatures.

The ionomer composition, the ethylene ester copolymer composition and/or the grafted polyolefin composition can be dried prior to any mixing step. The blend composition resins can be mixed as a dry blend, typically referred to as a "pellet blend", prior to feeding to the melt mixing process. Alternatively, the blend composition resins can be co-fed through two or more different feeders. In an extrusion process, the blend composition resins would typically be fed into the back, feed section of the extruder. However, the blend composition resins independently can be advantageously fed into two different locations of the extruder. For example, the ionomer composition can be added in the back, feed section of the extruder while the ethylene ester copolymer composition, the grafted polyolefin composition or a combination thereof is fed in the front of the extruder near the die plate. The extruder temperature profile is set up to allow the blend components to melt under the processing conditions. The screw design will also provide stress and, in turn, heat, to the resins as it mixes the molten blend composition resins. Generally, the blend components' melt processing temperature will be within the range of about 50° C. to about 300° C. However, the exact processing conditions will depend on the chemical compositions of the blend component resins used. Alternatively, the ethylene ester copolymer composition, the grafted polyolefin composition or combination thereof can be blended as a part of the parent acid copolymer neutralization process to form the ionomer composition, as described above. For example, a composition comprising a neutralizing compound such as sodium carbonate and an ethylene ester copolymer can be mixed with the acid copolymer precursor to the ionomer in the extruder.

After the blend composition has been melt blended, it is removed from the mixer and allowed to cool to a solid. For example, the melt blend is extruded through a die, cut into pellets and quenched in a cooling bath.

The ethylene ester copolymer composition, the grafted polyolefin composition or combination thereof is not dispersible in hot water through the dispersion method described below in the absence of the ionomer blend component. Pellets or other articles comprising the ethylene ester copolymer composition, the grafted polyolefin composition or combination thereof are also not dispersible in hot water even in the presence of pellets or other articles comprising the dispersible ionomer composition. Without being held to theory, it is believed that the ethylene ester copolymer composition, the grafted polyolefin composition or a combination thereof must provide a small enough particle size through the melt compounding process to allow for self-dispersibility of the total blend. The level of the ethylene ester copolymer composition, the grafted polyolefin composition or combination thereof is advantageously low, as described above, to maintain it as the dispersed phase within the total blend composition. Importantly, the ethylene ester copolymer composition, the grafted polyolefin composition or combination thereof provides the compatibility with the ionomer blend component necessary to provide the needed small particle size.

Dispersion Method

The dispersion method described herein surprisingly allows for the production of aqueous blend composition dispersions under very mild process conditions, such as low shear (e.g. simply stirring a mixture of hot water and solid blend composition) and low temperature (less than the boiling point of water) at atmospheric pressure, requiring less energy than prior art dispersion processes. This dispersion method further provides an inherently safer dispersion process through the use of preformed blend compositions by allowing for the avoidance of strong bases, such as aqueous sodium hydroxide (caustic), aqueous potassium hydroxide or ammonia, during the dispersion process.

The dispersion method comprises contacting an article comprising the blend composition with water at a temperature from about 80 to about 100° C. In some embodiments, the temperature is in the range from about 85 to about 90° C. Surprisingly, the blends described herein can be dispersed in water at 80 to 100° C., lower than that expected based on the prior art and requiring significantly less energy. However, one can appreciate that if the blends disperse in that temperature range they can also be dispersed at temperatures above 100° C.

The blend composition article may take any physical form desired, such as powder, pellets, melt cut pellets, coatings, films, sheets, molded articles and the like. The blend dispersion may be produced in any suitable vessel, such as a tank, vat, pail and the like. Stirring is useful to provide effective contact of the bulk blend article(s) with water as dispersion proceeds. Preferably the dispersion is produced in about 1 hour or less, such as in about 30 minutes or in about 20 minutes or less. Due to the surprisingly rapid dispersibility of the articles comprising the blend compositions, it is further contemplated that the process may proceed within a pipeline in which the components of the dispersion are charged at one end of the pipeline and form the dispersion as they proceed down the length of the pipeline. For example, the article may be mixed with water and passed through a heated zone, with or without added mixing, such as through static mixers. Alternatively, the article may be mixed with hot water and passed through a pipeline, with or without added mixing, such as through static mixers.

In one embodiment, the article comprising the blend composition is mixed with water under low shear conditions at room temperature (about 20 to 25° C.) and the temperature is raised to about 80 to about 100° C. In another embodiment, the article comprising the ionomer composition is mixed with water under low shear conditions at room temperature and the temperature is raised to about 85 to about 90° C.

In another embodiment, the article comprising the blend composition is mixed with water preheated to a temperature of about 80 to about 100° C. under low shear conditions. In another embodiment, the article comprising the blend composition is mixed with water preheated to a temperature of about 85 to about 90° C. under low shear conditions.

The aqueous blend dispersion preferably comprises from a lower limit of about 0.001 or about 1% to an upper limit of about 10, about 20, about 30 or about 50 weight %, of the blend composition based on the total weight of the blend composition and the water.

EXAMPLES

Table 1 summarizes the ethylene methacrylic acid dipolymers with copolymerized units of methacrylic acid at the indicated weight % of the total acid copolymer used to prepare the ionomers in Table 2. Ionomers were prepared from the acid copolymers using standard conditions. Melt flow rate (MFR) was measured according to ASTM D1238 at 190° C. using a 2160 g load. A similar ISO test is ISO 1133.

TABLE 1

|  | Methacrylic acid (weight %) | MFR (g/10 min) |
|---|---|---|
| ACR-1 | 19 | 400 |
| ACR-2 | 15 | 200 |
| ACR-3 | 19 | 180 |
| ACR-4 | 19 | 60 |
| ACR-5 | 21.7 | 30 |
| ACR-6 | 19 | 250 |
| ACR-7 | 23 | 270 |

Ionomers

Table 2 summarizes the ionomers derived from the ethylene methacrylic acid dipolymers, with the indicated percentage of the carboxylic acid groups neutralized with sodium hydroxide to form sodium salts or potassium carbonate to form potassium salts. The water dispersibility was determined according to the following General Procedure.

The General Procedure illustrates addition of the non-neutralized acid copolymer or ionomer to heated water. The procedure produced a mixture of water and 10 weight % solid loading (as weighed prior to addition to the water). Into a 1 quart (946.4 ml) metal can placed into a heating mantle element was added 500 ml of distilled water. An overhead paddle stirrer (3-paddle propeller type stirrer) was positioned into the center of the metal can and turned on to provide slow mixing. A thermocouple was positioned below the water surface between the paddle stirrer and the metal can surface. The paddle stirrer was typically set at a speed of about 170 rpm at the beginning of the process and generally raised to about 300 to 470 rpm as the viscosity built during dispersion formation. The distilled water was then heated with an Omega temperature controller to a temperature of 90 C. The non-neutralized acid copolymer resin ACR-1 or ionomer (55.5 grams, in the form of melt cut pellets) indicated in Table 2 was then added in one portion and the resulting mixture was stirred for a total of 20 minutes. The resulting mixture was then allowed to cool to room temperature.

Materials that did not form dispersions are denoted as "No" in Table 2, below. For those materials that formed a dispersion (denoted as "Yes" in Table 2), the dispersion was generally formed in less than 10 minutes and was stable even after being cooled to room temperature. As used herein, "stable" means that the dispersion, a clear liquid with no visible solids, did not exhibit any visual change after the initial cooling or on storage at room temperature. The Example dispersions remained as transparent liquids with no settling after storing at room temperature for periods of several weeks or longer.

TABLE 2

| Sample | Base Copolymer | Ion | Neutralization Level (%) | MFR (g/10 min.) | Water Dispersibility at 90° C. |
|---|---|---|---|---|---|
| C1 | ACR-1 | — | 0 | — | No |
| ION-1 | ACR-2 | Na | 51 | 4 | No |
| ION-2 | ACR-2 | Na | 70 | 0.9 | No |
| ION-3 | ACR-1 | Na | 40 | 12.7 | No |
| ION-4 | ACR-3 | Na | 45 | 3.7 | No |
| ION-5 | ACR-4 | Na | 50 | 0.8 | No |
| ION-6 | ACR-5 | Na | 40 | 0.7 | No |
| ION-7 | ACR-1 | Na | 50 | 5.3 | Yes |
| ION-8 | ACR-6 | Na | 60 | 1.4 | Yes |
| ION-9 | ACR-1 | Na | 70 | 1 | Yes |
| ION-10 | ACR-7 | Na | 55 | 1.4 | Yes |
| ION-11 | ACR-2 | K | 65 | 2.3 | No |
| ION-12 | ACR-4 | K | 50 | 0.9 | No |
| ION-13 | ACR-6 | K | 50 | 3.9 | Yes |
| ION-14 | ACR-1 | K | 50 | 5.4 | Yes |

The data in Table 2 show that ionomers prepared from an acid copolymer with 15 weight % of methacrylic acid did not form aqueous dispersions using this procedure, even with high neutralization levels (Ionomers ION-1, ION-2 and ION-11). Ionomers with neutralization levels less than 50% did not form dispersions, even with acid comonomers above 19 weight % of the acid copolymer (Ionomers ION-3, ION-4 and ION-6). Ionomers ION-5, ION-7, ION-12 and ION-14 involved acid copolymers with the same weight % of methacrylic acid and neutralized to the same level, but with different melt flows. ION-5 and ION-12, each derived from a parent acid copolymer with MFR of 60 and having MFR less than 1, did not provide dispersions. However, ION-7 and ION-14, each derived from a parent acid copolymer with MFR of 400 and having MFR greater than 1, provided dispersions.

Examples 1-4 and Comparative Example C2

The melt extrusion compounded blends described below in Table 3 were produced and tested for dispersibility in heated water as described above in the General Procedure, providing the results summarized below in Table 3. EMA-1 was a poly(ethylene-co-methyl acrylate) incorporating 24 weight % methyl acrylate comonomer with a MFR of 20. LDPE was a low density polyethylene. EMA-2 was a poly(ethylene-co-methyl acrylate) incorporating 35 weight % methyl acrylate comonomer with a MFR of 3. GPO was a metallocene polyolefin grafted with 0.9 weight % maleic anhydride.

TABLE 3

| Example | Blend Composition Component | (weight %) | MFR (g/10 min) | Water Dispersibility at 90° C. |
|---|---|---|---|---|
| 1 | ION-14 | 95.3 | 6.7 | Yes |
|   | EMA-1 | 4.7 |   |   |
| 2 | ION-14 | 90.4 | 8.3 | Yes |
|   | EMA-1 | 9.6 |   |   |
| C2 | ION-14 | 90.4 | 8.1 | No |
|   | EMA-1 | 4.4 |   |   |
|   | LDPE | 5.2 |   |   |
| 3 | ION-14 | 90.4 | 8.3 | Yes |
|   | EMA-1 | 4.4 |   |   |
|   | EMA-2 | 5.2 |   |   |
| 4 | ION-14 | 90.4 | 6.3 | Yes |
|   | EMA-1 | 4.4 |   |   |
|   | GPO | 5.2 |   |   |

Example 5

Into a 1 quart (946.4 ml) metal can placed into a heating mantle element was added 300 ml distilled water. An overhead paddle stirrer was positioned into the center of the metal can and turned on to provide slow mixing (assumed to be about 170 rpm). A thermocouple was positioned below the water surface between the paddle stirrer and the metal can surface. The distilled water was then heated to 90° C. with an Omega temperature controller to the temperature. The blend from Example 1 (129 grams, in the form of melt cut pellets) was then added in one portion and the resulting mixture stirred for a total of 20 minutes to form the viscous dispersion. The resulting dispersion was then allowed to cool to room temperature. The dispersion was stable even after being cooled to room temperature.

Example 6

Into a 1 quart (946.4 ml) metal can placed into a heating mantle element was added 300 ml distilled water. An overhead paddle stirrer was positioned into the center of the metal can and turned on to provide slow mixing (assumed to be about 170 rpm). A thermocouple was positioned below the water surface between the paddle stirrer and the metal can surface. The distilled water was then heated to 90° C. with an Omega temperature controller to the temperature. The blend from Example 2 (129 grams, in the form of melt cut pellets) was then added in one portion and the resulting mixture stirred for a total of 7 minutes to form the viscous dispersion. The resulting dispersion was then allowed to cool to room temperature. The dispersion was stable even after being cooled to room temperature.

Examples 7-12 and Comparative Example C3 illustrate addition of the blend to cold water followed by heating according to the following general procedure.

Into a 1 quart (946.4 ml) metal can placed into a heating mantle element was added 500 ml distilled water. An overhead paddle stirrer was positioned into the center of the metal can and turned on to provide slow mixing. A thermocouple was then positioned below the water surface between the paddle stirrer and the metal can surface. The blend, in the form of melt cut pellets, was then added in one portion. The resulting stirred mixture was then heated to 90° C. with an Omega temperature controller set to that temperature. After dispersion was complete, the mixture was allowed to cool to room temperature. The dispersion was stable even after being cooled to room temperature.

Comparative Example C3

Pellets of ION-14 (52.9 grams) and pellets of EMA-1 (2.6 grams) described above were each added in one portion. After 10 minutes at 90° C., ION-14 was totally converted to an aqueous dispersion while the pellets of EMA-1 remained entirely undispersed.

Example 7

The blend from Example 1 described above (55.5 grams) was added in one portion. The mixture had been totally converted to an aqueous dispersion as the temperature approached 90° C.

Example 8

The blend from Example 2 described above (55.5 grams) was added in one portion. The mixture had been totally converted to an aqueous dispersion after achieving the temperature of 90° C.

Example 9

The blend from Example 3 described above (55.5 grams) was added in one portion. The mixture had been totally converted to an aqueous dispersion as the temperature approached 90° C.

Example 10

The blend from Example 4 described above (55.5 grams) was added in one portion. The mixture had been totally converted to an aqueous dispersion as the temperature approached 90° C.

Example 11

The blend from Example 1 described above (26.3 grams) was added in one portion. The mixture had been totally converted to an aqueous dispersion as the temperature approached 87° C.

Example 12

The blend from Example 1 described above (125 grams) was added in one portion. The mixture had been totally converted to an aqueous dispersion as the temperature approached 90° C.

What is claimed is:

1. A method to produce an aqueous dispersion comprising water and about 0.001 to about 50 weight % of a mixture of an ionomer and an ethylene ester copolymer, the method comprising (1) providing a solid blend composition comprising
(a) about 75 to about 99.9 weight %, based on the combination of (a) and (b), of an ionomer composition comprising a parent acid copolymer consisting of copolymerized units of ethylene and about 18 to about 30 weight % of copolymerized units of acrylic acid or methacrylic acid, based on the total weight of the parent acid copolymer, the acid copolymer having a melt flow rate from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts comprising potassium cations, sodium cations or combinations thereof; and (b) about 0.1 to about 25 weight %, based on the combination of (a) and (b), of an ethylene ester copolymer consisting of copolymerized units of ethylene and about 10 to about 45 weight % of copolymerized units of an alpha, beta-ethylenically unsaturated carboxylic acid ester, based on the total weight of the ethylene ester copolymer;

(2) mixing the solid blend composition with water heated to a temperature from about 80 to about 100° C. to provide a heated aqueous blend dispersion; and (3) optionally cooling the heated aqueous blend dispersion to a temperature of about 20 to 30° C., wherein the blend remains dispersed in the liquid phase.

2. The method of claim 1 wherein the mixture of polymers consists essentially of the ionomer and at least one ethylene ester copolymer.

3. The method of claim 1 comprising an ionomer wherein the cations of the carboxylate salts consist essentially of sodium cations.

4. The method of claim 1 comprising an ionomer wherein the cations of the carboxylate salts consist essentially of potassium cations.

5. The method of claim 1 wherein the acid copolymer has a MFR from about 250 to about 400 g/10 min.

6. The method of claim 1 wherein the alpha, beta-ethylenically unsaturated carboxylic acid ester comonomer is methyl acrylate, ethyl acrylate, isopropyl acrylate, or butyl acrylate.

7. The method of claim 1 wherein the alpha, beta-ethylenically unsaturated carboxylic acid ester comonomer is methyl acrylate.

8. The method of claim 1 wherein providing the solid blend composition comprising (a) and (b) comprises melt mixing.

9. The method of claim 1 wherein providing the solid blend composition comprising (a) and (b) comprises melt extrusion blending.

* * * * *